United States Patent
Huang

(10) Patent No.: US 9,081,548 B2
(45) Date of Patent: Jul. 14, 2015

(54) ASSEMBLY MECHANISM AND ELECTRONIC DEVICE THEREWITH

(71) Applicant: Wistron Corporation, New Taipei (TW)

(72) Inventor: Guan-Chih Huang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 202 days.

(21) Appl. No.: 13/956,319

(22) Filed: Jul. 31, 2013

(65) Prior Publication Data

US 2014/0111916 A1    Apr. 24, 2014

(30) Foreign Application Priority Data

Oct. 18, 2012   (TW) .............................. 101138487 A

(51) Int. Cl.
*G06F 1/16*    (2006.01)
*G06F 3/02*    (2006.01)

(52) U.S. Cl.
CPC ............ *G06F 1/1654* (2013.01); *G06F 1/1626* (2013.01); *G06F 1/1669* (2013.01); *G06F 1/1681* (2013.01); *G06F 3/0202* (2013.01)

(58) Field of Classification Search
CPC ...................................................... G06F 1/1681
USPC ......... 361/679.27, 679.55; 455/575.4; 16/242
See application file for complete search history.

(56) References Cited

U.S. PATENT DOCUMENTS

| | | | |
|---|---|---|---|
| 6,381,128 B1 * | 4/2002 | Kramer .................... | 361/679.55 |
| 7,239,505 B2 * | 7/2007 | Keely et al. ............... | 361/679.09 |
| 7,255,317 B2 * | 8/2007 | Huang et al. .................. | 248/371 |
| 7,280,348 B2 * | 10/2007 | Ghosh ...................... | 361/679.27 |
| 2007/0217135 A1 * | 9/2007 | Chuang et al. ................ | 361/681 |
| 2012/0162879 A1 * | 6/2012 | Totsuka et al. ........... | 361/679.01 |

* cited by examiner

*Primary Examiner* — Adrian S Wilson
(74) *Attorney, Agent, or Firm* — Winston Hsu; Scott Margo

(57) ABSTRACT

An assembly mechanism with easy assembly is disclosed. The assembly mechanism includes a first sliding member, an assembly member, a second sliding member and a pushing structure. The first sliding member, whereon an opening is formed, is installed on a second module in a slidable manner. The assembly member with an end being detachably contained inside the opening and an another end being pivoted to a first module is driven by the first module to slide the first sliding member. The second sliding member is installed on the first sliding member in a slidable manner and for covering the opening to constrain the end of the assembly member inside the opening. The pushing structure is disposed on the second module for pushing the second sliding member to separate from the opening, so as to remove the end of the assembly member from the opening.

20 Claims, 9 Drawing Sheets

ASSEMBLY MECHANISM AND ELECTRONIC DEVICE THEREWITH

BACKGROUND OF THE INVENTION

1. Field of the Invention

The present invention relates to an assembly mechanism and an electronic device therewith, and more particularly, to an assembly mechanism with easy assembly and an electronic device therewith.

2. Description of the Prior Art

With development of the touch panel industry, a tablet computer with a touch panel is gradually implemented into human's daily life. A user can utilize a finger to directly touch the touch panel of the tablet computer to perform a touch control instruction, such as a sliding cursor instruction, a zooming in/out instruction and so on. Recently, the tablet computer is coupled to an external keyboard, not only for providing a user with a tablet computer mode in which the touch control instruction can be performed on the touch panel, but also for providing the user with a notebook computer mode in which conventional operation of a notebook computer can be performed on the tablet computer coupled, so as to enhance flexibility of the tablet computer in use.

Conventionally, a hinge mechanism is used for connecting a lateral side of the tablet computer and the external keyboard, so that the tablet computer is capable of expanding and containing relative to the external keyboard for achieving the aforesaid notebook computer mode. Furthermore, an assembly mechanism is further used for connecting another lateral side of the tablet computer to the external keyboard in a slidable manner. In such a manner, the tablet computer can adjust an angle in use for facilitating the user to operate by sliding the assembly mechanism relative to the external keyboard.

However, the external keyboard is equipped with keys for the user to operate, and thus area occupied by the keys constrains space that the assembly mechanism slides relative to the external keyboard, i.e. the angle of the tablet computer in use is constrained by the space occupied by the keys. Accordingly, it reduces the flexibility of the tablet computer in use. Conventionally, a released mechanism is utilized for releasing the assembly mechanism and the external keyboard, so that the other lateral side of the tablet computer is capable of passing over the space occupied by the keys, so as to increase the angle of the tablet computer in use. The conventional released mechanism utilizes a sliding button to separate the assembly mechanism from the external keyboard, which requires additional components, such as the sliding button, and thus it increases costs. In addition, when the other lateral side of the tablet computer is desired to be released, a sliding motion of the sliding button is required, and thus it results in inconvenience of assembly.

SUMMARY OF THE INVENTION

The present invention provides an assembly mechanism with easy assembly and an electronic device therewith for solving above drawbacks.

According to an embodiment of the present invention, an assembly mechanism for installing a first module on the second module includes a first sliding member, an assembly member, a second sliding member and a pushing structure. The first sliding member is installed on the second module in a slidable manner, and an opening is formed on the first sliding member. An end of the assembly member is detachably contained inside the opening on the first sliding member, and an another end of the assembly member is pivoted to a lateral side of the first module. The assembly member is driven by the first module to slide the first sliding member in a first direction when the first module rotates in the first rotating direction. The second sliding member is installed on the first sliding member in a slidable manner, and the second sliding member is for covering the opening, so as to constrain the end of the assembly member inside the opening. The pushing structure is disposed on the second module, and the pushing structure is for driving the second sliding member to separate from the opening in a separating direction when the first sliding member is slid in the first direction, so as to remove the end of the assembly member from the opening.

According to another embodiment of the present invention, the second sliding member includes a pushing portion disposed in a position corresponding to the pushing structure, and the pushing portion is for cooperating with the pushing structure, so that the pushing structure and the pushing portion move relatively when the first sliding member is slid in the first direction, so as to separate the second sliding member from the opening in the separating direction.

According to another embodiment of the present invention, the pushing structure and the pushing portion are respectively an incline structure.

According to another embodiment of the present invention, the assembly mechanism further includes at least one recovering member connected to the second sliding member. The at least one recovering member drives the second sliding member to slide in a recovery direction opposite to the separating direction, so that the second sliding member covers the opening on the first sliding member.

According to another embodiment of the present invention, the first sliding member includes at least one first sliding structure substantially oriented parallel to the separating direction, and the second sliding member includes at least one second sliding structure corresponding to the at least one first sliding structure. The at least one second sliding structure cooperates with the at least one first sliding structure for sliding the second sliding member in the separating direction or in the recovery direction.

According to another embodiment of the present invention, the at least one first sliding structure is a sliding slot, and the at least one second sliding structure is a plate-shaped rib. The plate-shaped rib is slidably disposed inside the sliding slot.

According to another embodiment of the present invention, the recovering member is a torsion spring.

According to another embodiment of the present invention, the assembly mechanism further includes a sliding mechanism for installing the first sliding member on the second module in a slidable manner.

According to another embodiment of the present invention, the sliding mechanism includes a hole and a guiding shaft. The hole structure is disposed on the first sliding member. The guiding shaft is fixed on the second module and disposed through the hole structure in an orientation substantially parallel to the first direction or a second direction opposite to the first direction.

According to another embodiment of the present invention, the assembly member is driven to slide the first sliding member in the second direction by the first module when the first module rotates in a second rotating direction opposite to the first rotating direction. The assembly mechanism further includes at least one first guiding structure disposed on the second module. The at least one first guiding structure guides the second sliding member to slide in a recovery direction opposite to the separating direction when the first sliding member is slid in the second direction, so that the second sliding member covers the opening on the first sliding member.

According to another embodiment of the present invention, the second sliding member includes at least one second guiding structure disposed in a position corresponding to the at least one first guiding structure. The at least one second guiding structure cooperates with the at least one first guiding structure, so that the at least one first guiding structure and the at least one second guiding structure move relatively when the first sliding member is slid in the second direction, so as to guide the second sliding member to slide in the recovery direction.

According to another embodiment of the present invention, the at least one first guiding structure and the at least one second guiding structure are respectively an incline structure.

According to another embodiment of the present invention, the assembly member includes a connecting rod and a pivoting rod. The connecting rod is disposed on the end of the assembly member, and the connecting rod is for detachably installing the end of the assembly member inside the opening on the first sliding member. The pivoting rod is disposed on the another end of the assembly member, and the pivoting rod is for pivoting the another end of the assembly member to the lateral side of the first module.

According to another embodiment of the present invention, the assembly mechanism further includes a magnetic member installed on the first sliding member. The magnetic member attracts the connecting rod of the assembly member into the opening on the first sliding member.

According to another embodiment of the present invention, the assembly mechanism further includes a resilient member installed on the pivoting rod of the assembly member. The resilient member is for recovering the assembly member.

According to another embodiment of the present invention, the first direction is substantially perpendicular to the separating direction.

According to another embodiment of the present invention, an electronic device includes a first module, a second module and an assembly mechanism. The second module is installed on the first module in a closable manner. The assembly mechanism is for installing the first module on the second module and includes a first sliding member, an assembly member, a second sliding member and a pushing structure. The first sliding member is installed on the second module in a slidable manner, and an opening is formed on the first sliding member. An end of the assembly member is detachably contained inside the opening on the first sliding member, and an another end of the assembly member is pivoted to a lateral side of the first module. The assembly member is driven by the first module to slide the first sliding member in a first direction when the first module rotates in the first rotating direction. The second sliding member is installed on the first sliding member in a slidable manner, and the second sliding member is for covering the opening, so as to constrain the end of the assembly member inside the opening. The pushing structure is disposed on the second module, and the pushing structure is for driving the second sliding member to separate from the opening in a separating direction when the first sliding member is slid in the first direction, so as to remove the end of the assembly member from the opening.

According to another embodiment of the present invention, the electronic device further includes a hinge module with both ends pivoted to the first module and the second module, so that the second module is expanded or contained on the first module.

In summary, the first module of the present invention can slide relative to the second module in the first direction or in the second direction by utilizing the assembly mechanism. When the first module drives the first sliding member of the assembly mechanism to slide relative to the second module in the first direction, the pushing structure of the assembly mechanism pushes the second sliding member to move in the separating direction, so that the second sliding member is incapable of covering the opening on the first sliding member. In such a manner, the assembly member connected to the lateral side of the first module can be removed from the opening on the first sliding member, so as to separate the lateral side of the first module from the second module. When the first module drives the first sliding member of the assembly mechanism to slide relative to the second module in the second direction, the recovering member and/or the first guiding structure of the assembly mechanism activates the second sliding member to move in the recovery direction opposite to the separating direction, so that the second sliding member covers the opening on the first sliding member. In such a manner, the assembly member connected to the lateral side of the first module can be constrained inside the opening on the first sliding member, so as to fix the lateral side of the first module on the second module.

As mentioned above, the assembly mechanism of the present invention can be used for separating the first module and the second module, so that the first module can cross over the operating area, i.e. the keyboard area. In other words, the angle included between the first module and the second module is not constrained by the operating area, i.e. the keyboard area, and thus it can enhance flexibility of the first module in use. Furthermore, it is not required additional sliding buttons and sliding motion to drive the assembly mechanism of the present invention to separate from the second module. As a result, it can reduce costs and increase convenience of assembly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
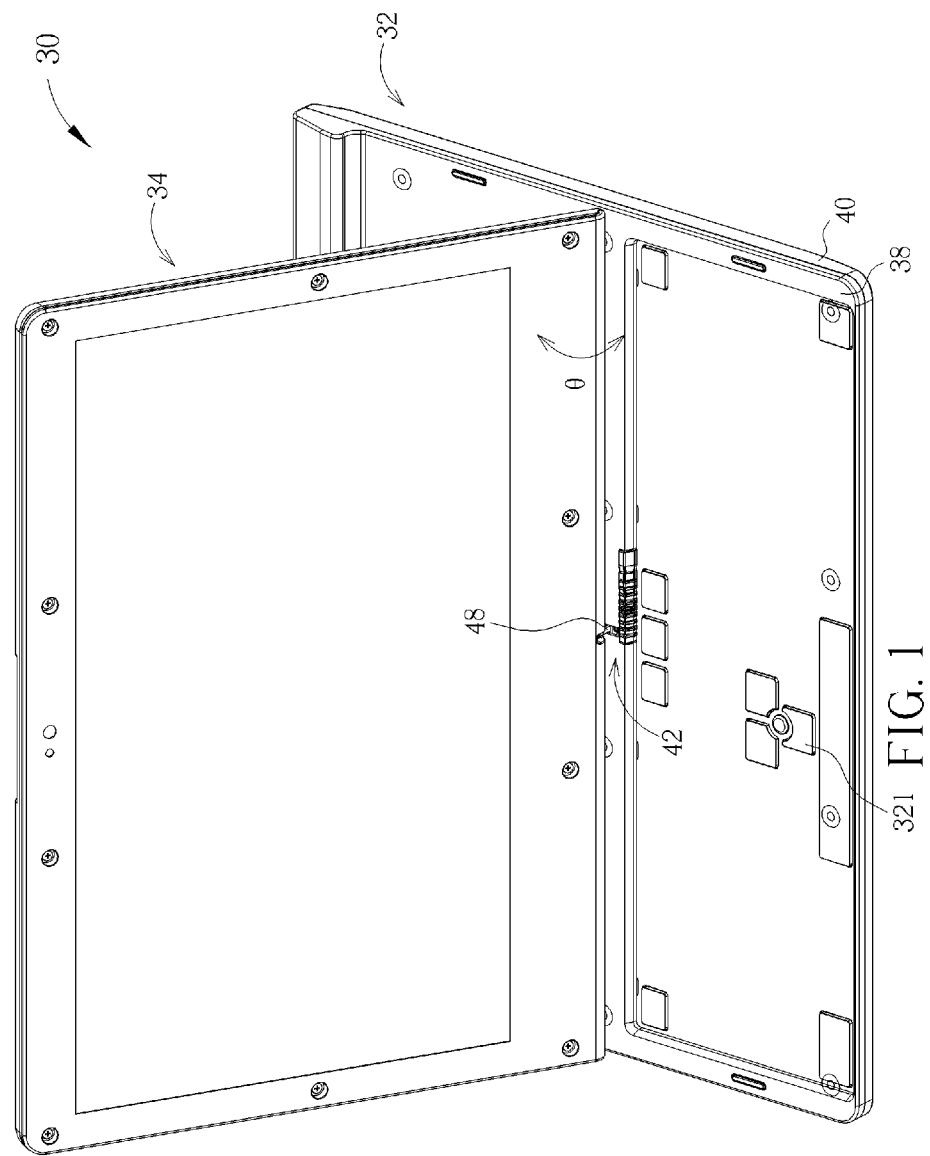
FIG. 1 is a schematic diagram of an electronic device in an expanded status according to an embodiment of the present invention.
Figure 2:
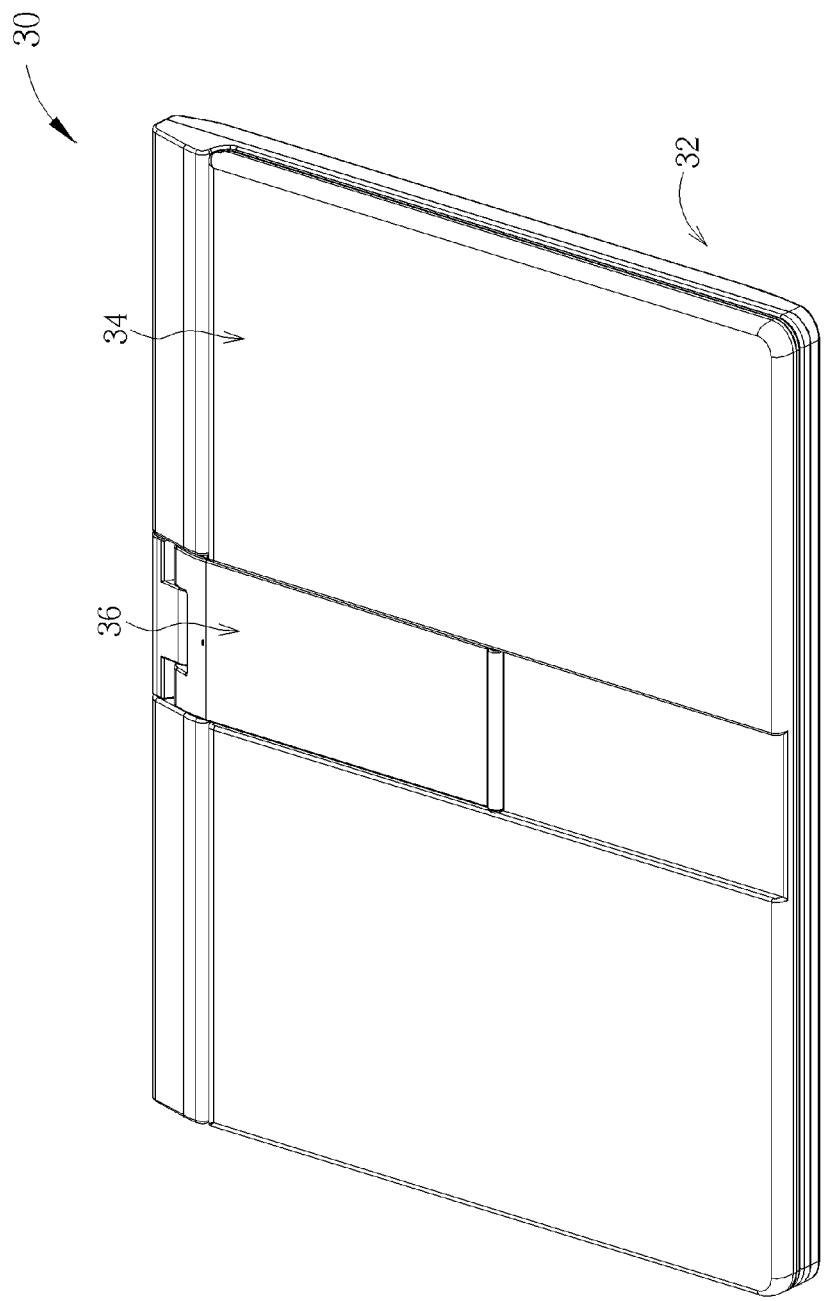
FIG. 2 is a schematic diagram of the electronic device in a contained status according to the embodiment of the present invention.
Figure 3:
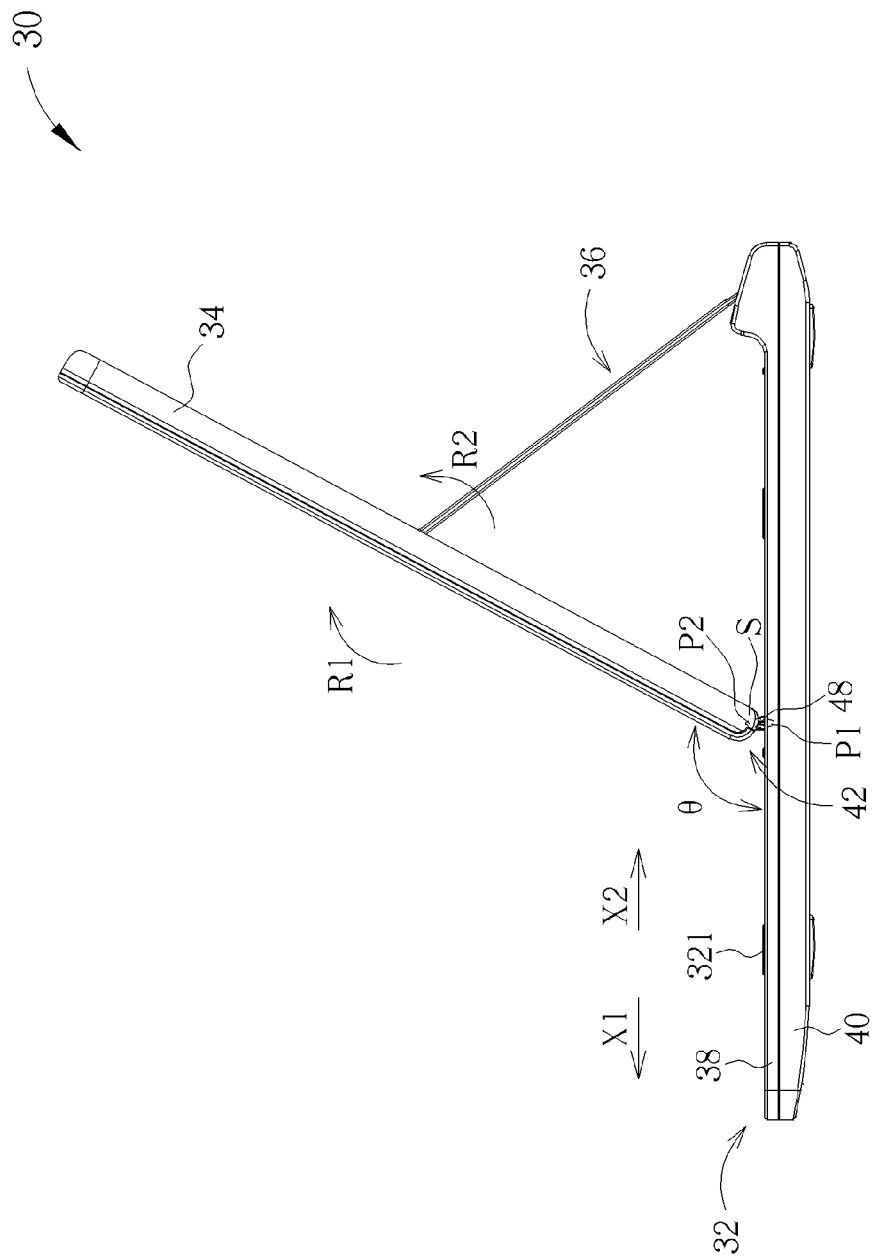
FIG. 3 is a side view of the electronic device shown in FIG. 1.

Please refer to FIG. 1 to FIG. 3. FIG. 1 is a schematic diagram of an electronic device 30 in an expanded status according to an embodiment of the present invention. FIG. 2 is a schematic diagram of the electronic device 30 in a contained status according to the embodiment of the present invention. FIG. 3 is a side view of the electronic device 30 shown in FIG. 1. As shown in FIG. 1 to FIG. 3, the electronic device 30 includes a second module 32, a first module 34 and a hinge module 36. The first module 34 is installed on the second module 32 in a closable manner. Both ends of the hinge module 36 are pivoted to the first module 34 and the second module 32. Thus, the second module 32 is capable of rotating relative to the first module 34, so as to be expanded on the first module 34. Accordingly, the electronic device 30 can be in the expanded status shown in FIG. 1 for a user to operate. Alternatively, the second module 32 is capable of rotating relative to the first module 34, so as to be contained on the first module 34. Accordingly, the electronic device 30 can be in the contained status shown in FIG. 2 for the user to carry or contain.

In this embodiment, the second module 32 is a keyboard module, and the first module 34 is a tablet computer. Implementations of the second module 32 and the first module 34 are not limited to those mentioned in this embodiment. For example, the second module 32 can be a touch panel module with a touch screen as well, and the first module 34 can be a liquid crystal display as well. As for which one of the above-mentioned designs is adopted, it depends on practical demands. Furthermore, the second module 32 includes a first casing 38 and a second casing 40. The first casing 38 and the second casing 40 cooperatively envelop internal electronic components, such as a main board, a plunge mechanism of the keyboard, a rubber dome and so on. Practically, the first casing 38 and the second casing 40 are an upper casing and a lower casing of the second module 32, respectively.

As shown in FIG. 1 and FIG. 3, the electronic device 30 further includes an assembly mechanism 42. The assembly mechanism 42 is used for installing a lateral side S of the first module 34 on the second module 32 in a slidable manner, so that the lateral side S of the first module 34 slides relative to the second module 32 for adjusting an angle θ included between the first module 34 and the second module 32. In such a manner, the user can preferably adjust the angle θ included between the first module 34 and the second module 32 for comfortably utilizing the electronic device 30. Practically, the angle θ is between 120 degrees and 130 degrees. Designs of the angle θ are not limited to those mentioned in this embodiment, and it depends on practical demands.

Figure 4:
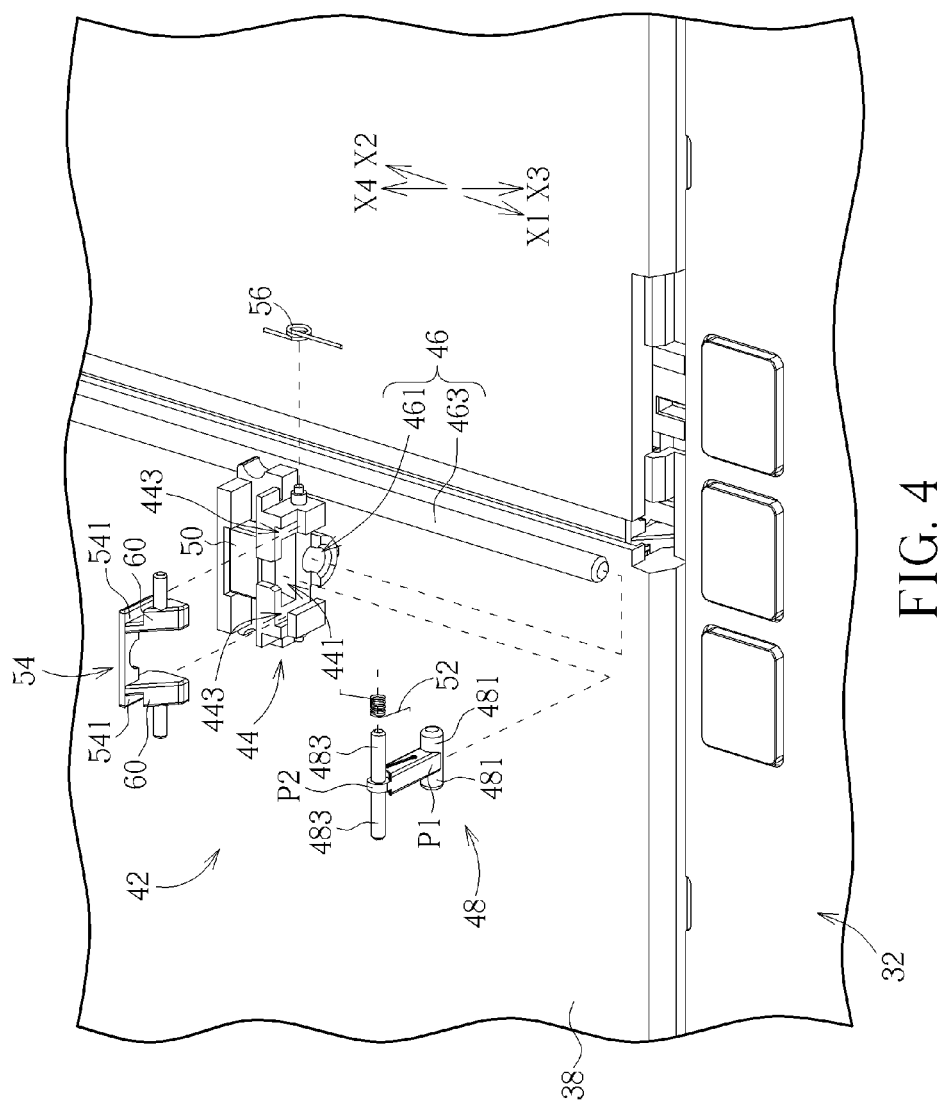
FIG. 4 is an exploded diagram of an assembly mechanism according to the embodiment of the present invention.
Figure 5:
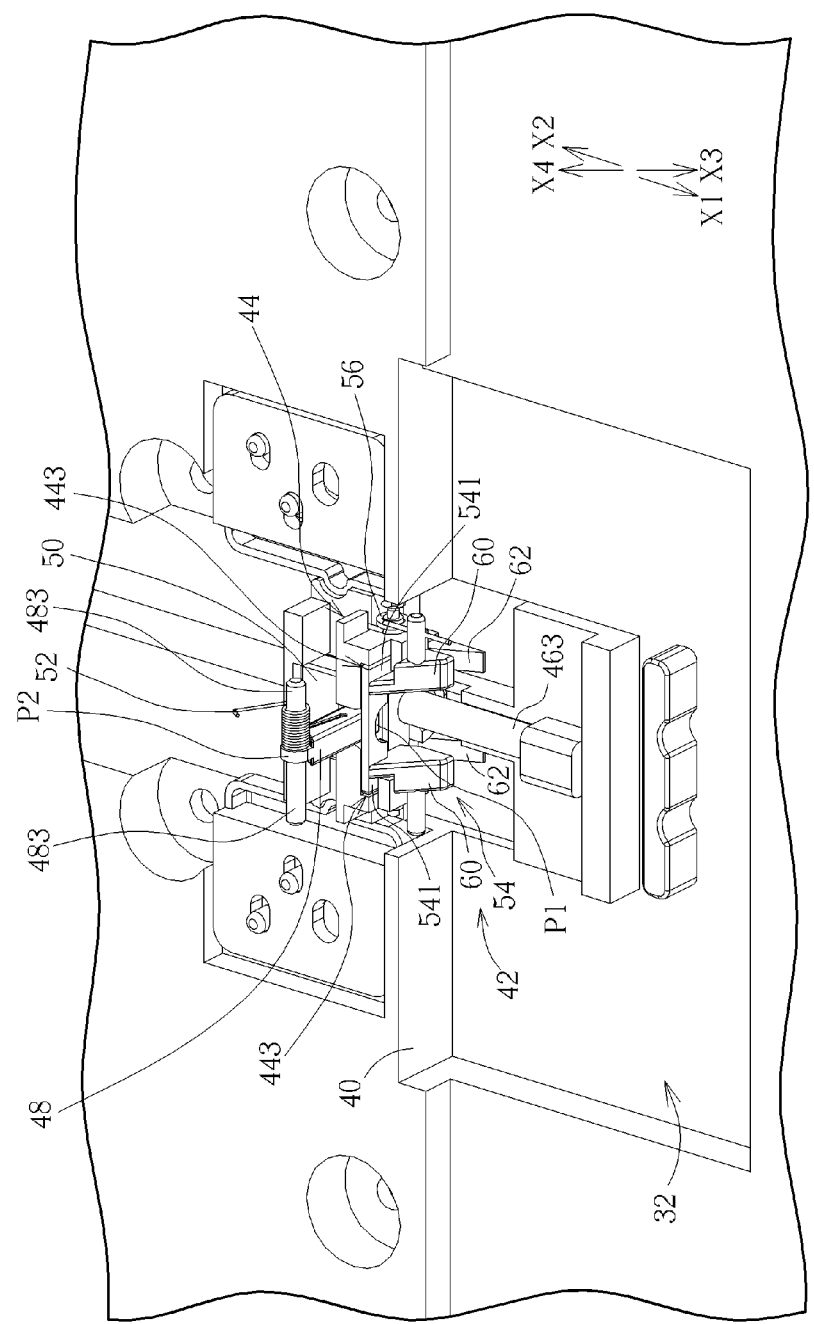
FIG. 5 is a diagram of the assembly mechanism in an assembled status according to the embodiment of the present invention.

Please refer to FIG. 4 and FIG. 5. FIG. 4 is an exploded diagram of the assembly mechanism 42 according to the embodiment of the present invention. FIG. 5 is a diagram of the assembly mechanism 42 in an assembled status according to the embodiment of the present invention. In order to clarify internal structures of the assembly mechanism 42, the first casing 38 of the second module 32 and the first module 34 are omitted in FIG. 5. As shown in FIG. 4 and FIG. 5, the assembly mechanism 42 includes a first sliding member 44 and a sliding mechanism 46. An opening 441 is formed on the first sliding member 44, and the first sliding member 44 is installed on the second casing 40 of the second module 32 in a slidable manner. Furthermore, the sliding mechanism 46 includes a hole structure 461 and a guiding shaft 463, and the hole structure 461 is disposed on the first sliding member 44.

When the first sliding member 44 is desired to be installed on the second casing 40 of the second module 32, the guiding shaft 463 is disposed through the hole structure 461 on the first sliding member 44 first, and then the guiding shaft 463 is fixed on the second casing 40 of the second module 32. In such a manner, the first sliding member 44 is slidably disposed on the second casing 40 of the second module 32 by utilizing the sliding mechanism 46. Since an orientation of the guiding shaft 463 is substantially parallel to a first direction X1 or a second direction X2 opposite to the first direction X1 after the first sliding member 44 is installed on the second casing 40 of the second module 32, the guiding shaft 463 is capable of constraining the first sliding member 44 to slide in the first direction X1 or in the second direction X2 when the first sliding member 44 slides relative to the second module 32.

It should be noticed that mechanisms of the sliding mechanism 46 are not limited to those mentioned in this embodiment. For example, the sliding mechanism 46 can be a combination of a sliding slot and a sliding track as well. The sliding track is disposed on the second casing 40, and the sliding slot is slidably engaged with the sliding track. In summary, mechanisms capable of slidably installing the first sliding member 44 on the second module 32 are within the scope of the present invention. As for which one of the above-mentioned designs is adopted, it depends on practical demands.

As shown in FIG. 3 to FIG. 5, the assembly mechanism 42 further includes an assembly member 48. A first end P1 of the assembly member 48 is detachably contained inside the opening 441 on the first sliding member 44, and a second end P2 of the assembly member 48 is pivoted to the lateral side S of the first module 34. When the first module 34 is rotated in a first rotating direction R1 shown in FIG. 3 by the hinge module 36, the assembly member 48 is driven to pivot relative to the lateral side S of the first module 34 by the first module 34. Meanwhile, since the first end P1 of the assembly member 48 is contained inside the opening 441 on the first sliding member 44, the assembly member 48 is capable of driving the first sliding member 44 to slide in the first direction X1.

On the other hand, when the first module 34 is rotated in a second rotating direction R2 opposite to the first rotating direction R1 shown in FIG. 3 by the hinge module 36, the assembly member 48 is driven to pivot relative to the lateral side S of the first module 34 by the first module 34. Meanwhile, since the first end P1 of the assembly member 48 is contained inside the opening 441 on the first sliding member 44, the assembly member 48 is capable of driving the first sliding member 44 to slide in the second direction X2. In summary, the assembly mechanism 42 of the present invention utilizes linkage of the assembly member 48 for converting pivot motion of the first module 34 into a sliding motion of the first sliding member 44. Furthermore, the assembly mechanism 42 of the present invention further utilizes the guiding shaft 463 of the sliding mechanism 46 for constraining the first sliding member 44 to slide relative to the second module 32 only in the first direction X1 or in the second direction X2.

In addition, the assembly member 48 includes two connecting rods 481 and two pivoting rods 483. The two connecting rods 481 are disposed on the first end P1 of the assembly member 48, and the two pivoting rods 483 are disposed on the second end P2 of the assembly member 48. Amounts of the connecting rod 481 and the pivoting rod 483 are not limited to those mentioned in this embodiment. For example, the assembly member 48 can include one connecting rod 481 and one pivoting rod 483 as well. In other words, structures of the assembly member 48 with at least one connecting rod 481 and at least one pivoting rod 483 are within the scope of the present invention.

Furthermore, the connecting rods 481 on the first end P1 of the assembly member 48 are detachably contained inside the opening 441 on the first sliding member 44. In this embodiment, the connecting rods 481 can be, but not limited to, cylindrical rods. For example, the connecting rods 481 can be rectangular rods as well. As for which one of the above-mentioned designs is adopted, it depends on practical demands. The pivoting rods 483 on the second end P2 of the assembly member 48 are pivoted to the lateral side S of the first module 34, so that the assembly member 48 pivots relative to the lateral side S of the first module 34. In this embodiment, the pivoting rods 483 are cylindrical rods.

In addition, the assembly mechanism 42 further includes a magnetic member 50 installed on the first sliding member 44. In this embodiment, the magnetic member 50 is glued on the first sliding member 44, and ways to install the magnetic member 50 on the first sliding member 44 are not limited to those mentioned in this embodiment. For example, the magnetic member 50 can be hooked on the first sliding member 44 as well. As for which one of the above-mentioned designs is adopted, it depends on practical demands.

Figure 6:
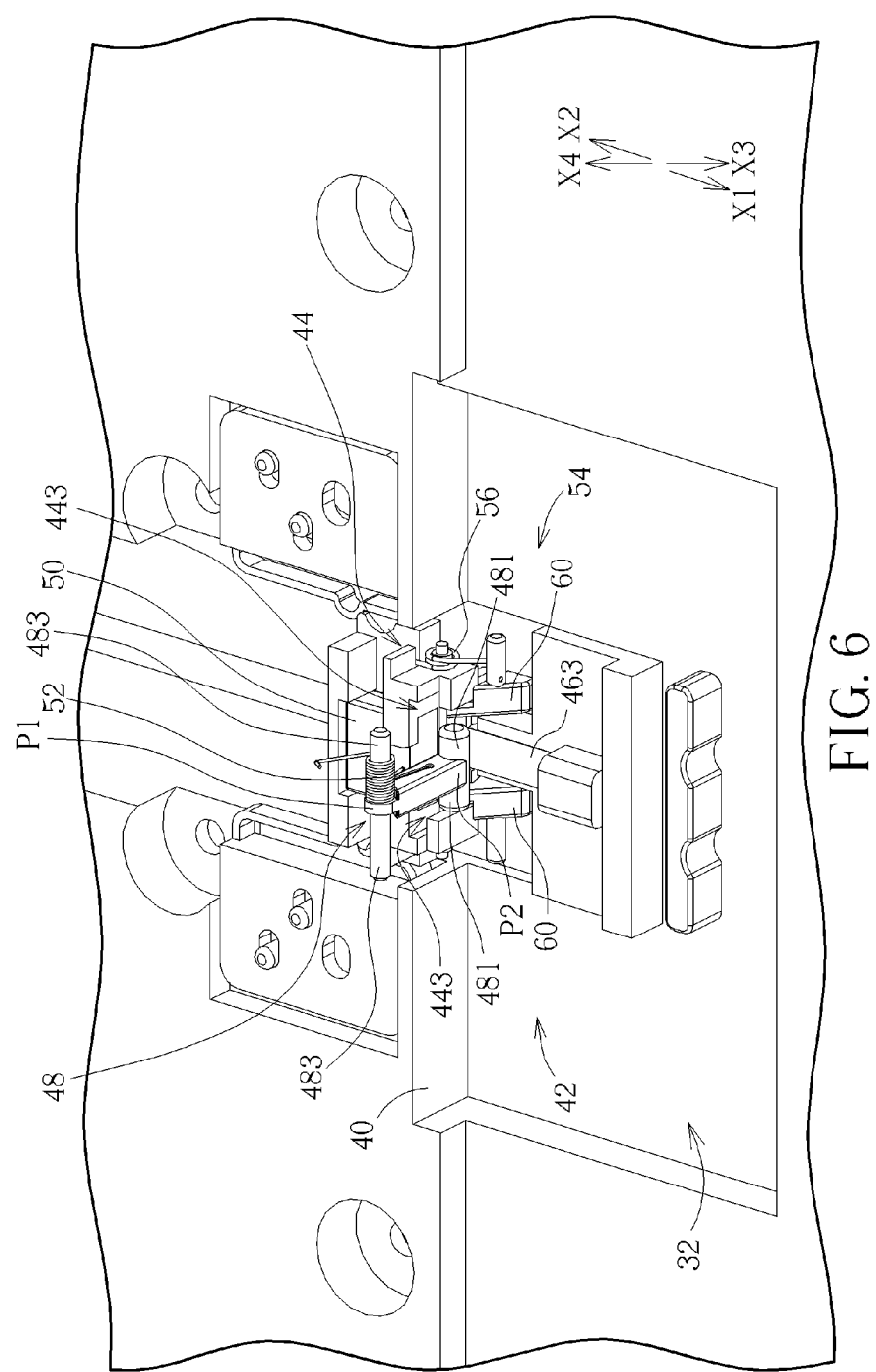
FIG. 6 is a diagram of the assembly mechanism in a released status according to the embodiment of the present invention.

Please refer to FIG. 4 to FIG. 6. FIG. 6 is a diagram of the assembly mechanism 42 in a released status according to the embodiment of the present invention. In order to clarify the internal structures of the assembly mechanism 42, the first casing 38 of the second module 32 and the first module 34 are omitted in FIG. 6. As shown in FIG. 4 to FIG. 6, the assembly mechanism 42 further includes a resilient member 52 installed on the pivoting rod 483 of the assembly member 48. When the first end P1 of the assembly member 48 is desired to be contained inside the opening 441 on the first sliding member 44, the resilient member 52 is used for recovering the assembly member 48, so that the assembly member 48 pivots to a position shown in FIG. 6. Then, when the assembly member 48 approaches the first sliding member 44, the magnetic member 50 attracts the connecting rods 481 of the assembly member 48 into the opening 441 on the first sliding member 44, so as to install the connecting rods 481 of the assembly member 48 inside the opening 441 on the first sliding member 44. As mentioned above, the magnetic member 50 and the resilient member 52 facilitate the first end P1 of the assembly member 48 to be installed inside the opening 441 on the first sliding member 44. In this embodiment, the resilient member 52 is a torsion spring, the magnetic member 50 is a magnet, and the connecting rods 481 of the assembly member 48 are made of magnetic materials, such as metal, magnetic and so on.

In addition, the assembly mechanism 42 further includes a second sliding member 54 installed on the first sliding member 44 in a slidable manner. When the connecting rods 481 of the assembly member 48 are contained inside the opening 441 on the first sliding member 44, the second sliding member 54 is used for covering the opening 441 on the first sliding member 44, so as to prevent the connecting rods 481 of the assembly member 48 from separating from the opening 441 on the first sliding member 44. In such a manner, the first end P1 of the assembly member 48 can be constrained inside the opening 441 on the first sliding member 44.

Furthermore, the first sliding member 44 includes two first sliding structures 443 substantially oriented parallel to a separating direction X3 or a recovery direction X4 opposite to the separating direction X3, as shown in FIG. 4. The second sliding member 54 includes two second sliding structures 541 corresponding to the two first sliding structures 443. When the second sliding member 54 and the first sliding member 44 are assembled, the two first sliding structures 443 are wedged with the two second sliding structures 541. Accordingly, the first sliding structures 443 can cooperate with the second sliding structures 541, so that the second sliding member 54 is slidably installed on the first sliding member 44. Since the first sliding structures 443 are substantially parallel to the separating direction X3 or the recovery direction X4 shown in FIG. 4, the first sliding structures 443 can constrain the second sliding member 54 to slide in the separating direction X3 or in the recovery direction X4 when the second sliding member 54 slides relative to the first sliding member 44. In this embodiment, the first direction X1 is substantially perpendicular to the separating direction X3.

Amounts of the first sliding structure 443 and the second sliding structure 541 are not limited to those mentioned in this embodiment, e.g. the present invention can include only one first sliding structure 443 and only one second sliding structure 541. In other words, structures with at least one first sliding structure 443 and at least one second sliding structure 541 are within the scope of the present invention. In this embodiment, the two first sliding structures 443 are respectively a sliding slot, and the two second sliding structures 541 are respectively a plate-shaped rib. The plate-shaped ribs are slidably disposed inside the sliding slot. Structural designs of the first sliding structure 443 and the second sliding structure 541 are not limited to those mentioned in this embodiment, and it depends on practical demands.

Figure 7:
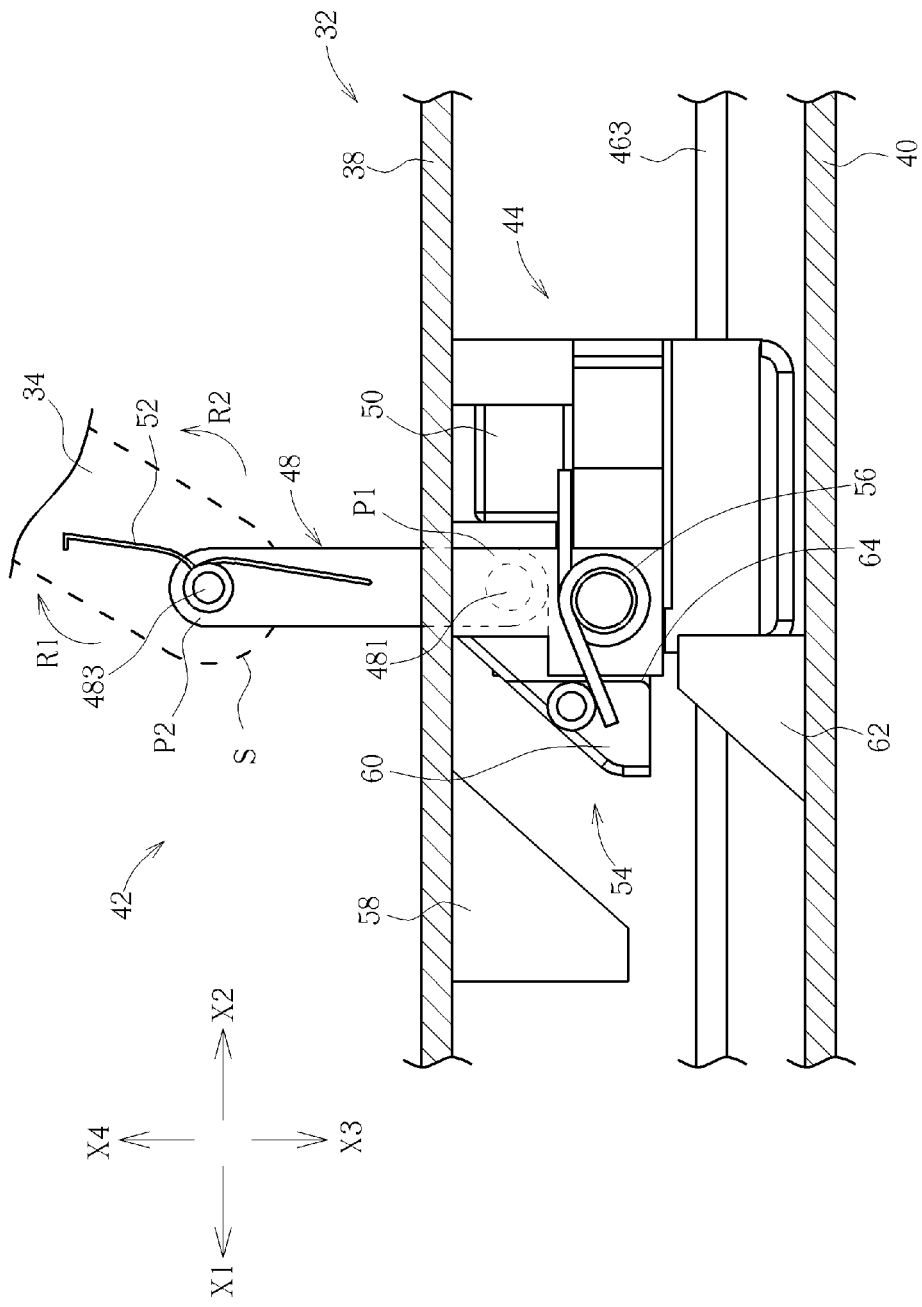
FIG. 7 is a sectional diagram of the assembly mechanism in the assembled status according to the embodiment of the present invention.
Figure 8:
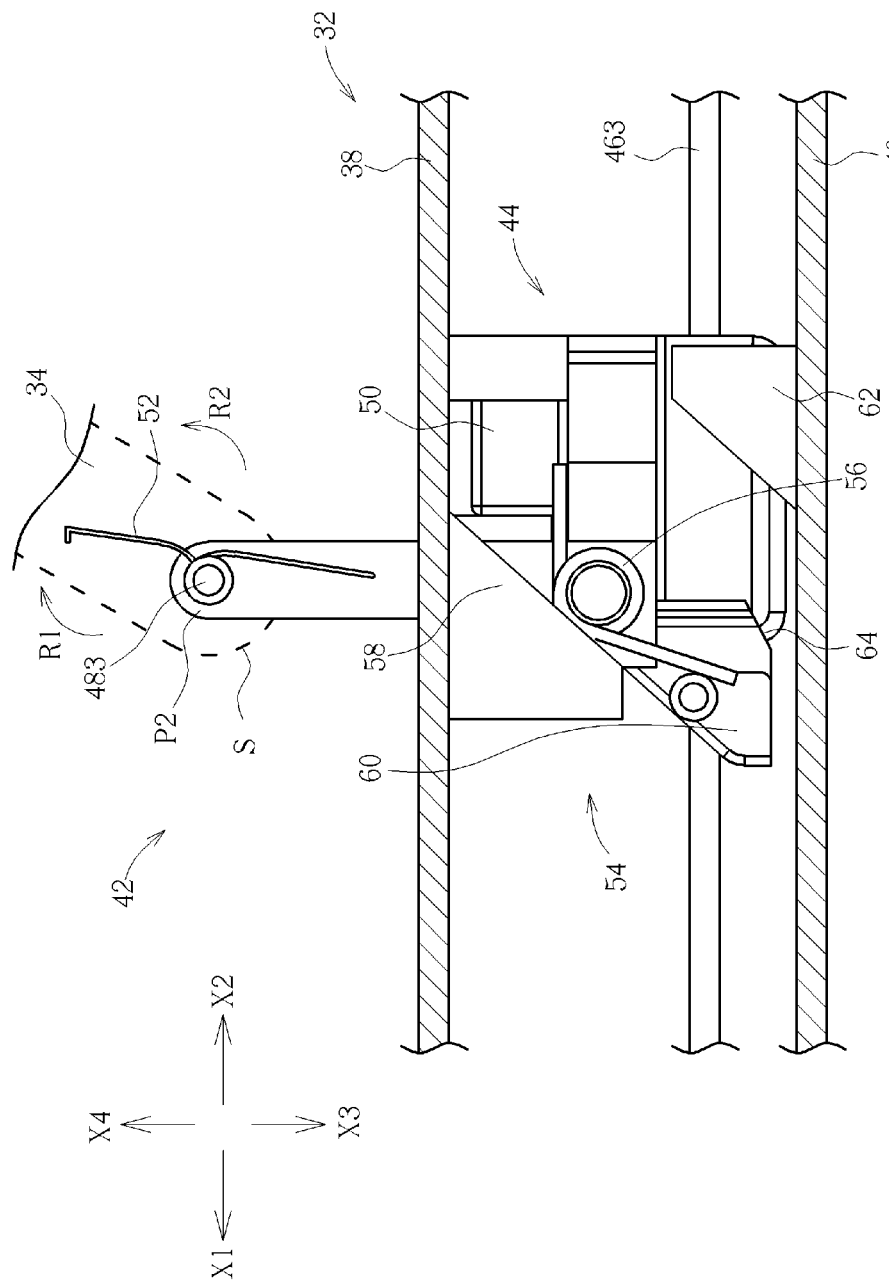
FIG. 8 is a sectional diagram of the assembly mechanism in the released status according to the embodiment of the present invention.

Please refer to FIG. 4 to FIG. 8. FIG. 7 is a sectional diagram of the assembly mechanism 42 in the assembled status according to the embodiment of the present invention. FIG. 8 is a sectional diagram of the assembly mechanism 42 in the released status according to the embodiment of the present invention. As shown in FIG. 4 to FIG. 8, the assembly mechanism 42 further includes at least one recovering member 56 connected to the second sliding member 54. In this embodiment, the recovering member 56 is a torsion spring. The torsion spring, i.e. the recovering member 56, sheathes on a protruding boss of the first sliding member 44, and an acting end of the torsion spring, i.e. the recovering member 56, abuts against a protruding post of the second sliding member 54, as shown in FIG. 7 and FIG. 8. In such a manner, the recovering member 56 can provide the second sliding member 54 with a resilient force, so as to drive the second sliding member 54 to slide from a released position shown in FIG. 8 to an assembled position shown in FIG. 7 in the recovery direction X4 opposite to the separating direction X3. In such a manner, the second sliding member 54 can cover the opening 441 on the first sliding member 44, as shown in FIG. 5 and FIG. 7, so as to constrain the first end P1 of the assembly member 48 inside the opening 441 on the first sliding member 44.

In addition, the assembly mechanism 42 further includes a pushing structure 58 disposed on the first casing 38 of the second module 32. When the first module 34 is rotated in the first rotating direction R1, as shown in FIG. 7, the assembly member 48 drives the first sliding member 44 and the second sliding member 54 to slide in the first direction X1. In this embodiment, the pushing structure 58 is an incline structure. When the second sliding member 54 slides to a position where the second sliding member 54 contacts the pushing structure 58, i.e. the incline structure, in the first direction X1, the pushing structure 58, i.e. the incline structure, can force the second sliding member 54 to slide along a surface that the pushing structure 58, i.e. the incline structure, contacts the second sliding member 54. Accordingly, the pushing structure 58 pushes the second sliding member 54 downwards. In other words, the pushing structure 58 is used for pushing the second sliding member 54 to separate from the opening 441 on the first sliding member 44 in the separating direction X3. When the second sliding member 54 is pushed from the assembled position shown in FIG. 7 to the released position shown in FIG. 8 by the pushing structure 58, the first end P1 of the assembly member 48 can be removed from the opening 441, as shown in FIG. 6. In such a manner, the lateral side S of the first module 34 can be separated from the second module 32 cooperatively with the assembly member 48.

As shown in FIG. 7 and FIG. 8, the second sliding member 54 can further include a pushing portion 60 disposed in a position corresponding to the pushing structure 58. When the first sliding member 44 and the second sliding member 54 slides in the first direction X1, the pushing portion 60 is used for cooperating with the pushing structure 58, so that the pushing portion 60 of the second sliding member 54 and the pushing structure 58 move relatively. In such a manner, the second sliding member 54 is capable of being pushed from the assembled position shown in FIG. 7 to the released position shown in FIG. 8 by the pushing structure 58 more smoothly. In other words, the pushing portion 60 can facilitate the pushing structure 58 to push the second sliding member 54 to separate from the opening 441 on the first sliding member 44 in the separating direction X3. In this embodiment, the pushing structure 58 and the pushing portion 60 are respectively an incline structure.

As shown in FIG. 5 to FIG. 8, the assembly mechanism 42 can further include two first guiding structures 62 disposed on the first casing 38 of the second module 32. When the first module 34 is rotated in the second rotating direction R2, as shown in FIG. 7, the assembly member 48 drives the first sliding member 44 and the second sliding member 54 to slide in the second direction X2. Furthermore, when the second sliding member 54 slides to a position where the second sliding member 54 contacts the first guiding structures 62 in the first direction X1, the first guiding structures 62 can push the second sliding member 54 upwards. In other words, the first guiding structures 62 are used for pushing the second sliding member 54 to slide in the recovery direction X4. When the second sliding member 54 is pushed from the released position shown in FIG. 8 to the assembled position shown in FIG. 7 by the first guiding structures 62, the second sliding member 54 covers the opening 441 on the first sliding member 44, so as to constrain the first end P1 of the assembly member 48 in the opening 441, as shown in FIG. 5. In such a manner, the lateral side S of the first module 34 can be fixed on the second module 32 cooperatively with the assembly member 48.

furthermore, the second sliding member 54 can further include two second guiding structures 64 disposed in a position corresponding to the first guiding structures 62. When the first sliding member 44 and the second sliding member 54 slides in the second direction X2, the second guiding structures 64 is used for cooperating with the first guiding structures 62, so that the second guiding structures 64 of the second sliding member 54 and the first guiding structures 62 move relatively. In such a manner, the second sliding member 54 is capable of being pushed from the released position shown in FIG. 8 to the assembled position shown in FIG. 7 by the pushing structure 58 more smoothly. In other words, the second guiding structures 64 can facilitate the first guiding structures 62 to push the second sliding member 54 to slide in the recovery direction X4.

Furthermore, the first guiding structures 62 and the second guiding structures 64 can be further used for assisting the recovering member 56 to slide the second sliding member 54, and thus it facilitates the second sliding member 54 to slide from the released position shown in FIG. 8 to the assembled position shown in FIG. 7 in the recovery direction X4. In other words, the first guiding structures 62 and the second guiding structures 64 of the present invention can be omitted. It should be noticed that amounts of the first guiding structure 62 and the second guiding structure 64 are not limited to those mentioned in this embodiment. For example, the assembly mechanism 42 can include only one first guiding structure 62, and the second sliding member 54 can include only one second guiding structure 64. In other words, structures with at least one first guiding structure 62 and at least one second guiding structure 64 are within the scope of the present invention. In this embodiment, the first guiding structures 62 and the second guiding structures 64 are incline structures.

Figure 9:
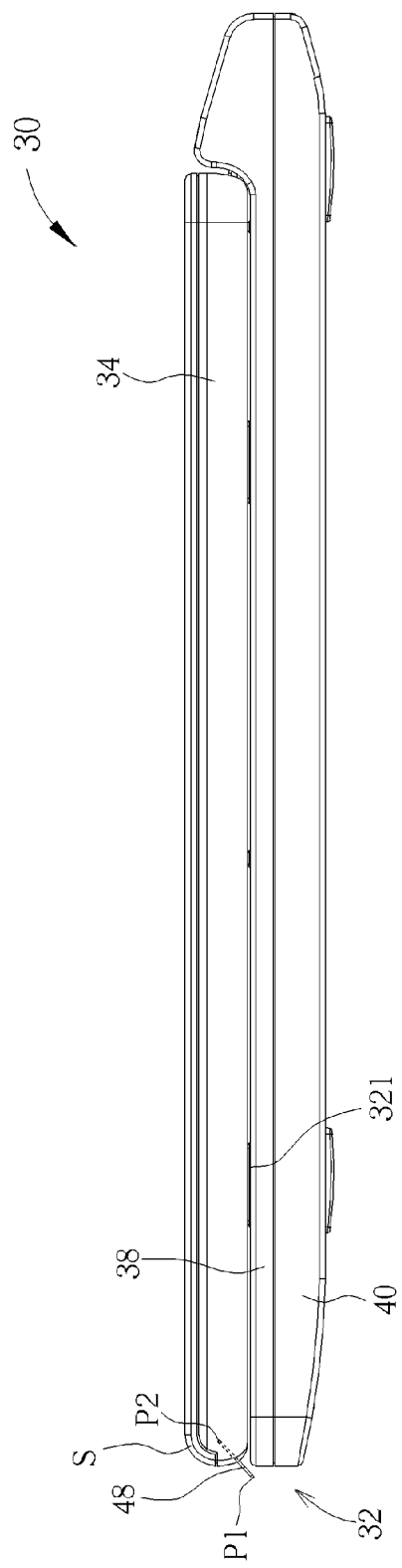
FIG. 9 is a side view of the electronic device in another status according to the embodiment of the present invention.

Please refer to FIG. 3 and FIG. 9. FIG. 9 is a side view of the electronic device 30 in another status according to the embodiment of the present invention. As shown in FIG. 3 and FIG. 9, when the lateral side S of the first module 34 cooperatively with the assembly member 48 are separated from the second module 32, the lateral side S of the first module 34 can cross over an operating area 321, such as a keyboard area, disposed on the second module 32, so as to enhance the angle θ included between the first module 34 and the second module 32. Moreover, the first module 34 can be laid down on the second module 32, as shown in FIG. 9, for providing the user with another mode of the electronic device 30, such as a tablet computer mode, and thus it enhances flexibility of the electronic device 30 in use.

Compared to the prior art, the first module of the present invention can slide relative to the second module in the first direction or in the second direction by utilizing the assembly mechanism. When the first module drives the first sliding member of the assembly mechanism to slide relative to the second module in the first direction, the pushing structure of the assembly mechanism pushes the second sliding member to move in the separating direction, so that the second sliding member is incapable of covering the opening on the first sliding member. In such a manner, the assembly member connected to the lateral side of the first module can be removed from the opening on the first sliding member, so as to separate the lateral side of the first module from the second module. When the first module drives the first sliding member of the assembly mechanism to slide relative to the second module in the second direction, the recovering member and/or the first guiding structure of the assembly mechanism activates the second sliding member to move in the recovery direction opposite to the separating direction, so that the second sliding member covers the opening on the first sliding member. In such a manner, the assembly member connected to the lateral side of the first module can be constrained inside the opening on the first sliding member, so as to fix the lateral side of the first module on the second module.

As mentioned above, the assembly mechanism of the present invention can be used for separating the first module and the second module, so that the first module can cross over the operating area, i.e. the keyboard area. In other words, the angle included between the first module and the second module is not constrained by the operating area, i.e. the keyboard area, and thus it can enhance flexibility of the first module in use. Furthermore, it is not required additional sliding buttons and sliding motion to drive the assembly mechanism of the present invention to separate from the second module. As a result, it can reduce costs and increase convenience of assembly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An assembly mechanism for installing a first module on a second module, comprising:
   a first sliding member installed on the second module in a slidable manner, an opening being formed on the first sliding member;
   an assembly member with an end detachably contained inside the opening on the first sliding member and an another end pivoted to a lateral side of the first module, the assembly member being driven by the first module to slide the first sliding member in a first direction when the first module rotates in a first rotating direction;
   a second sliding member installed on the first sliding member in a slidable manner, the second sliding member being for covering the opening, so as to constrain the end of the assembly member inside the opening; and
   a pushing structure disposed on the second module, the pushing structure being for driving the second sliding member to separate from the opening in a separating direction when the first sliding member is slid in the first direction, so as to remove the end of the assembly member from the opening.

2. The assembly mechanism of claim 1, wherein the second sliding member comprises a pushing portion disposed in a position corresponding to the pushing structure, and the pushing portion is for cooperating with the pushing structure, so that the pushing structure and the pushing portion move relatively when the first sliding member is slid in the first direction, so as to separate the second sliding member from the opening in the separating direction.

3. The assembly mechanism of claim 2, wherein the pushing structure and the pushing portion are respectively an incline structure.

4. The assembly mechanism of claim 1, further comprising:
   at least one recovering member connected to the second sliding member, the at least one recovering member driving the second sliding member to slide in a recovery direction opposite to the separating direction, so that the second sliding member covers the opening on the first sliding member.

5. The assembly mechanism of claim 4, wherein the first sliding member comprises at least one first sliding structure substantially oriented parallel to the separating direction, the second sliding member comprises at least one second sliding structure corresponding to the at least one first sliding structure, and the at least one second sliding structure cooperating with the at least one first sliding structure for sliding the second sliding member in the separating direction or in the recovery direction.

6. The assembly mechanism of claim 5, wherein the at least one first sliding structure is a sliding slot, the at least one second sliding structure is a plate-shaped rib, and the plate-shaped rib is slidably disposed inside the sliding slot.

7. The assembly mechanism of claim 4, wherein the recovering member is a torsion spring.

8. The assembly mechanism of claim 1, further comprising a sliding mechanism for installing the first sliding member on the second module in a slidable manner.

9. The assembly mechanism of claim 8, wherein the sliding mechanism comprises:
   a hole structure disposed on the first sliding member; and
   a guiding shaft fixed on the second module and disposed through the hole structure in an orientation substantially parallel to the first direction or a second direction opposite to the first direction.

10. The assembly mechanism of claim 9, wherein the assembly member is driven to slide the first sliding member in the second direction by the first module when the first module rotates in a second rotating direction opposite to the first rotating direction, and the assembly mechanism further comprises:
    at least one first guiding structure disposed on the second module, the at least one first guiding structure guiding the second sliding member to slide in a recovery direction opposite to the separating direction when the first sliding member is slid in the second direction, so that the second sliding member covers the opening on the first sliding member.

11. The assembly mechanism of claim 10, wherein the second sliding member comprises at least one second guiding structure disposed in a position corresponding to the at least one first guiding structure, and the at least one second guiding structure cooperates with the at least one first guiding structure, so that the at least one first guiding structure and the at least one second guiding structure move relatively when the first sliding member is slid in the second direction, so as to guide the second sliding member to slide in the recovery direction.

12. The assembly mechanism of claim 11, wherein the at least one first guiding structure and the at least one second guiding structure are respectively an incline structure.

13. The assembly mechanism of claim 1, wherein the assembly member comprises:
    a connecting rod disposed on the end of the assembly member, the connecting rod being for detachably installing the end of the assembly member inside the opening on the first sliding member; and
    a pivoting rod disposed on the another end of the assembly member, the pivoting rod being for pivoting the another end of the assembly member to the lateral side of the first module.

14. The assembly mechanism of claim 13, further comprising:
    a magnetic member installed on the first sliding member, the magnetic member attracting the connecting rod of the assembly member into the opening on the first sliding member.

15. The assembly mechanism of claim 13, further comprising:
    a resilient member installed on the pivoting rod of the assembly member.

16. The assembly mechanism of claim 1, wherein the first direction is substantially perpendicular to the separating direction.

17. An electronic device, comprising:
    a first module;
    a second module installed on the first module in a closable manner; and
    an assembly mechanism for installing the first module on the second module, comprising:
       a first sliding member installed on the second module in a slidable manner, an opening being formed on the first sliding member;
       an assembly member with an end detachably contained inside the opening on the first sliding member and an another end pivoted to a lateral side of the first module, the assembly member being driven by the first module to slide the first sliding member in a first direction when the first module rotates in the first rotating direction;

a second sliding member installed on the first sliding member in a slidable manner, the second sliding member being for covering the opening, so as to constrain the end of the assembly member inside the opening; and a pushing structure disposed on the second module, the pushing structure being for driving the second sliding member to separate from the opening in a separating direction when the first sliding member is slid in the first direction, so as to remove the end of the assembly member from the opening.

18. The electronic device of claim 17, further comprising:
a hinge module with both ends pivoted to the first module and the second module, so that the second module is expanded or contained on the first module.

19. The electronic device of claim 17, wherein the second sliding member comprises a pushing portion disposed in a position corresponding to the pushing structure, and the pushing portion is for cooperating with the pushing structure, so that the pushing structure and the pushing portion move relatively when the first sliding member is slid in the first direction, so as to separate the second sliding member from the opening in the separating direction.

20. The electronic device of claim 17, wherein the assembly mechanism further includes a sliding mechanism for installing the first sliding member on the second module in a slidable manner, the sliding mechanism comprises:

a hole structure disposed on the first sliding member; and a guiding shaft fixed on the second module and disposed through the hole structure in an orientation substantially parallel to the first direction or a second direction opposite to the first direction.

* * * * *